United States Patent
Shimizu et al.

(10) Patent No.: US 8,512,437 B2
(45) Date of Patent: Aug. 20, 2013

(54) METHOD OF PRODUCING INORGANIC NANOPARTICLES IN ATMOSPHERE AND DEVICE THEREFOR

(75) Inventors: Yoshiki Shimizu, Ibaraki (JP); Takeshi Sasaki, Ibaraki (JP); Naoto Koshizaki, Ibaraki (JP); Kazuo Terashima, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 315 days.

(21) Appl. No.: 12/920,228

(22) PCT Filed: Feb. 26, 2009

(86) PCT No.: PCT/JP2009/053561
§ 371 (c)(1),
(2), (4) Date: Sep. 30, 2010

(87) PCT Pub. No.: WO2009/110371
PCT Pub. Date: Sep. 11, 2009

(65) Prior Publication Data
US 2011/0005352 A1    Jan. 13, 2011

(30) Foreign Application Priority Data
Mar. 4, 2008 (JP) ................................. 2008-053193

(51) Int. Cl.
*B22F 9/14* (2006.01)

(52) U.S. Cl.
USPC ...................................... 75/346; 219/121.38

(58) Field of Classification Search
None
See application file for complete search history.

(56) References Cited

U.S. PATENT DOCUMENTS

| | | | |
|---|---|---|---|
| 5,707,419 A * | 1/1998 | Tsantrizos et al. | 75/336 |
| 7,000,565 B2 * | 2/2006 | Fukuda et al. | 118/723 I |
| 2004/0137243 A1 * | 7/2004 | Gleason et al. | 428/447 |
| 2008/0206552 A1 | 8/2008 | Shimizu et al. | |

FOREIGN PATENT DOCUMENTS

| | | |
|---|---|---|
| EP | 1586674 A1 * | 10/2005 |
| JP | 05-209209 A | 8/1993 |
| JP | 2003-303814 A | 10/2003 |
| JP | 2003-328138 A | 11/2003 |
| JP | 2005-262111 A | 9/2005 |
| JP | 2006-104545 A | 4/2006 |
| JP | 2008-150703 A | 7/2008 |
| WO | 2008/023523 A1 | 2/2008 |

* cited by examiner

*Primary Examiner* — George Wyszomierski
(74) *Attorney, Agent, or Firm* — Howson & Howson LLP

(57) ABSTRACT

Provided are a method and a device for producing nanoparticles of a low melting point material such as gold at more than 10 times faster the rate of conventional technology while maintaining the time-averaged temperature of pulse-modulated atmospheric-pressure plasma at a temperature that is low enough so as not to damage a heat-sensitive material disposed downstream. This method of preparing nanoparticles of a low melting point inorganic material in which a wire made of a low melting point inorganic material is inserted into a plasma-generating capillary tube or a plasma-generating nozzle and atmospheric-pressure high frequency plasma is generated in the capillary tube or nozzle is characterized by generating the plasma by applying a high frequency voltage possessing a waveform which exhibits its maximum value when it rises and then immediately falls, and which is pulse-modulated so that the duty ratio thereof is 10% or less.

8 Claims, 3 Drawing Sheets

METHOD OF PRODUCING INORGANIC NANOPARTICLES IN ATMOSPHERE AND DEVICE THEREFOR

TECHNICAL FIELD

The present invention relates to a method and a device for preparing, with high efficiency, inorganic nanoparticles that exhibit superior mono-dispersibility in the atmosphere by using an atmospheric-pressure high frequency plasma.

BACKGROUND ART

Atmospheric-pressure plasma that can be stably generated in the atmosphere yields an advantage in that it does not require vacuum equipment, and the development of its stable generation method and application technology is being conducted with enthusiasm.

The present inventors are engaged in the development of material synthesizing technology and deposition technology in the atmosphere among the material process technologies employing atmospheric-pressure plasma generated in a nozzle or capillary tube (here, a tube shaped with a narrowed tip is referred to as a "nozzle" and a straight tube is referred to as a "capillary tube" for differentiation), and have made several proposals in the past.

For example, Patent Document 1 describes technology related to a method for stably maintaining the generation method of atmospheric-pressure plasma in the chemical vapor deposition (hereinafter referred to as "CVD") using a gas raw material.

Meanwhile, Patent Document 2 and Patent Document 3 relate to atmospheric-pressure plasma material deposition technology of using a metal wire as the raw material. This is a method of vaporizing the metal wire inserted into the nozzle or capillary tube by using plasma, and the details thereof are described below.

The technology described in Patent Document 2 relates to atmospheric-pressure plasma generation technology in a nozzle with an inner diameter of 50 μm or less, and technology of using the foregoing generation technology for depositing a metal or metallic compound material on a low melting point substrate, in which its melting point is 500° C. or less, in dots with a diameter of 1 to 100 μm and in lines with a width of 5 to 50 μm.

Moreover, the technology described in Patent Document 3 uses a capillary tube to deposit a metal or metallic compound as a thin film on a large area of several hundred μm² or even several cm² or more on various types of substrates.

The technologies described in Patent Document 2 and Patent Document 3 use the continuously generated high frequency as the plasma excitation source, and the gas temperature of the plasma reaches several thousand degrees locally. Accordingly, wires with a high melting point made of tungsten, molybdenum or the like are suitable as the raw material, and the preparation of the nanoparticles thereof and thin film deposition can be performed efficiently.

[Patent Document 1] Japanese Patent No. 4041878
[Patent Document 2] Japanese Published Unexamined Application No. 2005-262111
[Patent Document 3] International Publication No. 2008/023523
[Patent Document 4] Japanese Published Unexamined Application No. 2008-150703

DISCLOSURE OF THE INVENTION

Nevertheless, the deposition of high vapor pressure materials; that is, from a wire made of a low melting point material such as magnesium, tin, or indium is difficult. When attempting to insert a wire made of such low melting point material into a capillary tube or a nozzle and generate plasma, the moment that the plasma is ignited the inserted wire melts due to the heat from the plasma, and in many cases it is subject to spheroidizing due to the surface tension or cut into several fragments. In other words, although it is not impossible to efficiently deposit a low melting point material on a substrate, the range of selecting the appropriate conditions therefor is narrow, and requires extremely skilled operations. The same applies to cases of noble metals such as gold and platinum.

The present inventors have discovered technology for overcoming the foregoing problems, and previously filed an application (refer to Patent Document 4).

This technology relates to so-called pulse-modulated generation which periodically or randomly provides time for intermittently applying high frequency for generating plasma, and dissipating plasma or generating plasma at a low output. Since the plasma is once turned OFF before the temperature of the plasma rises and becomes steady, the plasma is not thermalized and is retained at a temperature level of room temperature in terms of time average. With this technology, it is possible to continuously prepare nanoparticles without damaging a tin wire whose melting point is approximately 220° C. In addition, it is also possible to prepare nanoparticles of gold whose melting point is approximately 1000° C., which is between a low melting point material such as tin and a high-melting point material such as tungsten.

Nevertheless, with the technology proposed in Patent Document 4, there was a drawback in that the process of preparing nanoparticles of a low melting point material such as gold was extremely slow. When this is figured, the number of gold nanoparticles with a diameter of 6 to 10 nm deposited per one square micrometer/minute was approximately 210 nanoparticles. With this numerical value, it would take more than four hours to be able to visually recognize a gold color on the substrate to which the particles were deposited.

If the output of high frequency is increased in order to speed up the process, even if it is based on pulse-modulated generation, the gas temperature of the plasma will rise and, as with the conventional technology, the wire will instantaneously melt. Moreover, a heat-sensitive material such as paper or PET disposed downstream of the plasma will be damaged due to the heat flux from the plasma.

In addition, the wire that is inserted into the capillary tube is a raw material and also functions as an internal electrode for stabilizing the plasma generation (refer to Patent Document 1). However, if the process is sped up, two problems will arise; namely, (1) shortage of the raw material, and (2) instability of the plasma generation associated with the passage of time.

The present invention was devised in view of the foregoing circumstances. Thus, an object of this invention is to provide a method and its device for producing nanoparticles of a low melting point material such as gold at more than 10 times faster than the rate of conventional technology while maintaining the time-averaged temperature of pulse-modulated atmospheric-pressure plasma at a temperature that is low enough so as not to damage a heat-sensitive material disposed downstream.

Another object of this invention is to provide a method and a device for gradually supplying the raw material wire into the plasma-generating capillary tube to make up for the shortage of raw materials due to consumption of the raw material wire due to the increase in the generation rate of nanoparticles of a low melting point material.

As a result of intense study to achieve the foregoing objects, the present inventors discovered that the waveform of the high frequency voltage to be applied significantly affects the preparation of nanoparticles.

Specifically, FIG. 1 shows the voltage waveform of the output high frequency, FIG. 1(a) is a typical voltage waveform of the technology proposed in Patent Document 4, and is a waveform in which the ON/OFF of the voltage at a frequency of several to several hundred Hz is superimposed on a high frequency of several hundred MHz. This waveform is a waveform under the conditions where the generation of gold nanoparticles is started, and the peak-to-peak voltage value measured on the output terminal side of the high frequency power source is 1 V, and the output of the high frequency power source is 12 W. As described, the generation efficiency of gold nanoparticles under the conditions of this high frequency output waveform is less than favorable. If the output of the high frequency is increased; that is, if the voltage is increased in order to improve the efficiency, the gas temperature of the plasma will rise and the object to be deposited disposed downstream will be damaged due to the heat flux, or the gold wire may become damaged.

Meanwhile, as shown in FIG. 1(b), although the high frequency generation time is extremely short at approximately 5% at a duty ratio of one cycle, a high voltage is applied only at the instant the high frequency is applied. With the waveform illustrated in FIG. 1(b), the maximum peak-to-peak voltage value is 2 V or more, and this is a voltage value that is more than double the waveform shown in FIG. 1(a). It was discovered that this instantaneous high voltage application is extremely effective in the preparation of nanoparticles.

The present invention was completed based on the foregoing discovery, and provides the following.

(1) A method of preparing nanoparticles of a low melting point inorganic material in which a wire made of a low melting point inorganic material is inserted into a plasma-generating capillary tube or a plasma-generating nozzle and atmospheric-pressure high frequency plasma is generated in the capillary tube or nozzle, wherein the plasma is generated by applying a high frequency voltage possessing a waveform which exhibits its maximum value when it rises and then immediately falls, and which is pulse-modulated so that the duty ratio thereof is 10% or less.

(2) The method of preparing inorganic nanoparticles according to (1) above, wherein the duty ratio is 5% or less.

(3) The method of preparing inorganic nanoparticles according to (1) or (2) above, wherein the generation of plasma is maintained by causing the waveform of the high frequency voltage which was pulse-modulated to be a waveform in which a rectangular waveform of a constant height is additionally added thereto.

(4) A device of preparing inorganic nanoparticles, comprising at least a plasma-generating capillary tube or a plasma-generating nozzle, a wire made of a low melting point inorganic material disposed in the capillary tube or nozzle, a high frequency application electrode for generating plasma in the capillary tube or nozzle, and a plasma-generating high frequency power source for supplying a high frequency voltage to the electrode, further including means for generating, as the high frequency voltage, a voltage possessing a waveform which exhibits its maximum value when it rises and then immediately falls, and which is pulse-modulated so that the duty ratio thereof is 10% or less.

(5) The device for preparing inorganic nanoparticles according to (4) above, further including means for introducing gas for plasma generation into the capillary tube or nozzle.

(6) The device for preparing inorganic nanoparticles according to (4) above, wherein a metallic capillary tube is disposed in the capillary tube or nozzle, and further including means for continuously supplying a wire made of the low melting point inorganic material into the metallic capillary tube.

(7) The device for preparing inorganic nanoparticles according to (6) above, further including means for introducing gas for plasma generation into a space between the capillary tube or nozzle and the metallic capillary tube.

Effect of the Invention

Nanoparticles of a low melting point material such as gold are generated when current flows into a wire made of a low melting point material. With the present invention, since the current value is high, nanoparticles are generated at rate 10 times faster than the rate of the technology of Patent Document 4, and the generation efficiency of nanoparticles is improved considerably. Meanwhile, since the average gas temperature of the plasma is low, nanoparticles of a low melting point material such as gold can be efficiently deposited on a heat-sensitive object to be deposited that is placed downstream of the plasma.

DESCRIPTION OF REFERENCE NUMERALS

Figure 1:
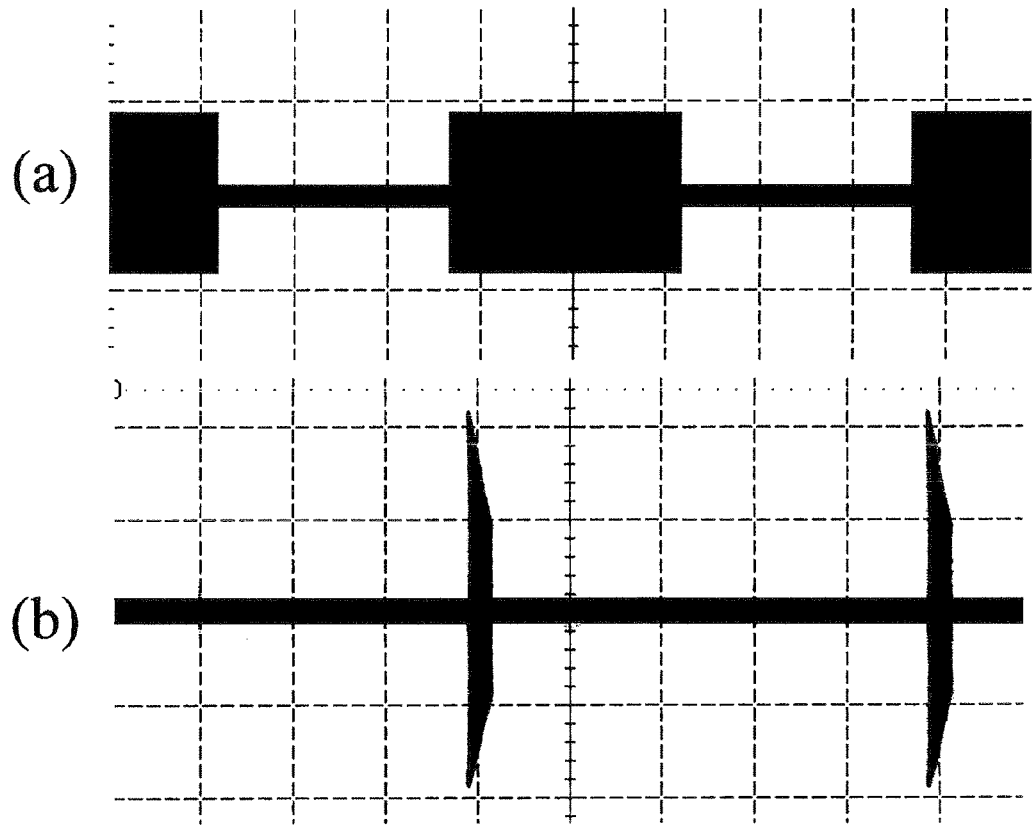
[FIG. 1] a diagram showing the application voltage output waveform (a) of a pulse-modulated high frequency plasma in the conventional method, and the application voltage output waveform (b) of the pulse-modulated high frequency plasma in the present invention

1: plasma-generating capillary tube
2: wire made of low melting point metal
3: arbitrary waveform creation system
4: function generator
5: high frequency generator
6: high frequency matching box
7: high frequency application electrode
8: gas supply pipe
9: material to be processed
10: metallic capillary tube
11: raw material wire
12: T-shaped gas supply pipe
13: raw material wire supply mechanism

BEST MODE FOR CARRYING OUT THE INVENTION

As the high frequency voltage to be applied for vaporizing or melting the wire made of a low melting point material inserted into a nozzle or capillary tube with the high frequency micro plasma which was generated in the nozzle or capillary tube in order to generate nanoparticles of a low melting point material, the present invention is characterized in using, as shown in FIG. 1(b), a high frequency voltage possessing a waveform which exhibits its maximum value when it rises and then immediately falls, and which is pulse-modulated so that the duty ratio thereof is 10% or less.

Instantaneous high voltage application will temporarily generate large current. The generated large current flows from the low melting point material as the raw material to the wire via the plasma. This is a type of inrush current, and melting or vaporization will instantaneously occur at the wire side to which the large current flew in. This melting or vaporization becomes the driving force for generating the nanoparticles.

The generation of this kind of large current will raise the plasma temperature and excessively heat the wire, but the plasma gas temperature and the wire temperature are maintained at a low temperature in terms of time average since the time that the large current flows is extremely short at 10% or less or preferably several % in one cycle.

Figure 2:
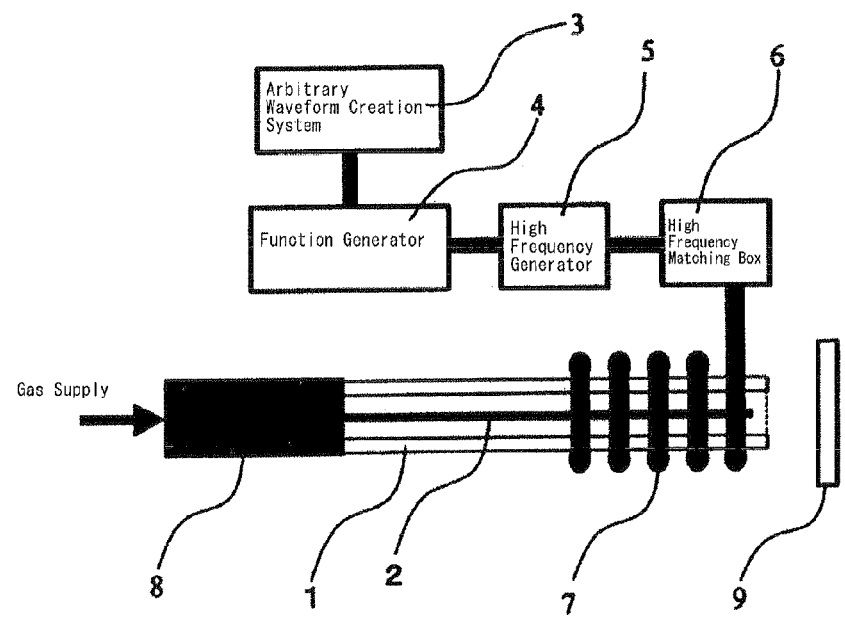
[FIG. 2] a schematic diagram showing an example of the device of the present invention

FIG. 2 is a schematic diagram showing an example of the device used in the present invention, and in FIG. 2 reference numeral 1 represents a plasma-generating capillary tube, 2 represents a wire made of a low melting point metal such as gold, 3 represents an arbitrary waveform creation system, 4 represents a function generator, 5 represents a high frequency generator, 6 represents a high frequency matching box, 7 represents a high frequency application electrode, 8 represents a gas supply pipe, and 9 represents a deposition substrate, and the wire 2 made of a low melting point metal also functions as an electrode.

Here, the creation of a special waveform as shown in FIG. 1(b) is performed using the arbitrary waveform creation system 3 of FIG. 2, and its signal is sent to the function generator 4 for performing control.

With the method and device of the present invention, as the plasma-generating tube, a capillary tube with an inner diameter of 300 to 800 µm, or a nozzle in which the inner diameter of its tip is 100 µm or less, preferably 50 µm or less is used.

As the high frequency voltage to be applied for generating plasma in the capillary tube or nozzle, a high frequency voltage of several hundred MHz is used by being pulse-modulated as described above.

In addition, with the device shown in FIG. 2, a coil shaped electrode is used as the high frequency application electrode 7, but the shape of the high frequency application electrode of the present invention is not limited to a coil shape, and may also be, for instance, a metal pipe or a metal plate.

As the low melting point material used as the wire in the method and device of the present invention, in addition to noble metals such as gold, preferably used are low melting point metals such as tin, magnesium, and indium, but inorganic materials such as non-metals may also be used so as long as they are a low melting point material. In the foregoing case, since the wire made of a low melting point material is unable to also function as an electrode, for instance, a separate electrode must be provided as with the device shown in FIG. 4 described later.

Moreover, as the gas for plasma generation to be introduced in the method and the device of the present invention, argon, a mixed gas of argon and hydrogen, or the like is used.

Furthermore, the material to be used as the deposition substrate 9 to be placed downstream of the outlet of the capillary tube or nozzle in the method and device of the present invention is not limited to materials with heat resistance such as metal, metal oxide, glass and ceramics, and even materials without heat resistance such as paper will not be subject to thermal damage.

When generating nanoparticles based on pulse-modulated generation, the grain size and the like of the nanoparticles can be controlled by changing the plasma generation time; that is, the duty ratio within the cycle.

Figure 3:
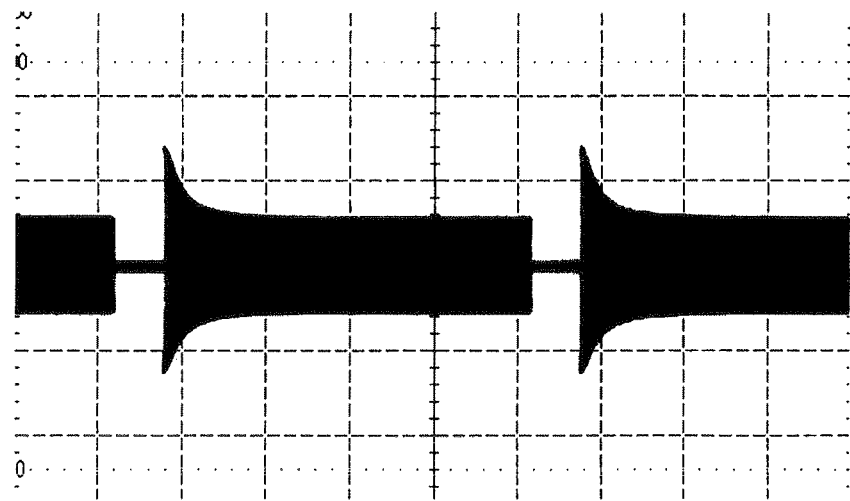
[FIG. 3] a diagram showing the application voltage output waveform at a high duty ratio of the present invention

Similar control can be performed in the present invention. For example, if the duty ratio of plasma generation is to be increased for the purpose of increasing the size of the nanoparticles, a wave form as shown in FIG. 3 is applied. Specifically, the waveform shown in FIG. 3 is obtained by causing a waveform of the high-frequency voltage which was pulse-modulated shown in FIG. 1(b) to be a waveform in which a rectangular waveform of a constant height is additionally added thereto.

In this case also, a high voltage is applied only at the instant that the high frequency is applied, and the generation of plasma is maintained by subsequently continuing to apply a low voltage. Consequently, the size of the nanoparticles prepared by instantaneously applying a high voltage can be increased, and the power consumption in generating the plasma can be as low as approximately 4 W. This power is a low output of approximately ⅓ in comparison to the case of FIG. 1(a), and it is consequently possible to inhibit the rise of the gas temperature of plasma.

The technology for making up for the high rate consumption of the raw material wire resulting from the speed up of the generation of nanoparticles described above is now explained.

Figure 4:
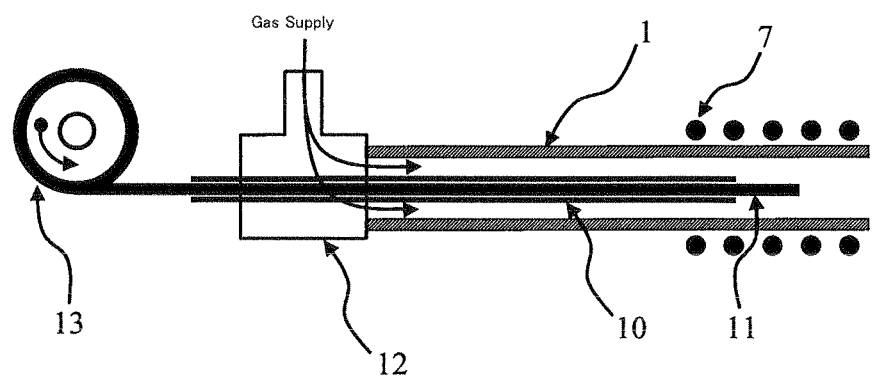
[FIG. 4] a diagram schematically showing an example of the device of the present invention which enables the continuous supply of the wire

FIG. 4 shows means for resolving the problem of high rate consumption of the raw material wire, and in FIG. 4 reference numeral 10 represents a metallic capillary tube, 11 represents a raw material wire, 12 represents a T-shaped gas supply pipe, and 13 represents a raw material wire supply mechanism.

With the device shown in FIG. 4, the raw material and the internal electrode are provided separately. Here, the metallic capillary tube 10 functions as the internal electrode. As the material of the metallic capillary tube 10, if a material that will not dissipate with the pulse-modulated plasma such as stainless, tungsten, molybdenum is used, the stable generation of plasma can be maintained perpetually.

In addition, the metallic capillary tube 10 also functions as a supply port of the raw material wire. Based on the raw material wire supply mechanism 13, the raw material wire 11 is supplied to the plasma generator via the metallic capillary tube 10. Here, only the portion that was fed from the tip of the metallic capillary tube 10 is melted or vaporized with the pulse-modulated plasma, and nanoparticles are consequently generated. If the raw material wire 11 is gradually supplied by the raw material wire supply mechanism 13 with the consumption of the tip of the raw material wire 11, nanoparticles can be continuously prepared.

EXAMPLES

The present invention is now explained with reference to the Example using the device shown in FIG. 2, but this invention is not limited to this Example. (Method of preparing gold nanoparticles with high efficiency)

A gold wire with a diameter of 100 µm was inserted into the plasma-generating capillary tube 1 with an inner diameter of 800 µm, and argon gas mixed with 4% hydrogen was supplied into the capillary tube from a gas supply pipe at a flow rate of 200 ccm.

Subsequently, a high frequency of 450 MHz was subject to pulse-modulated generation with the waveform shown in FIG. 1(b). The conditions of pulse modulation were as follows: frequency was 100 Hz, duty ratio was 10% or less, and maximum peak-to-peak voltage at the instant the high frequency was applied was approximately 2 V on the output terminal side of the high frequency power source. Here, the output value on the high frequency power source side was approximately 1 W.

Figure 5:
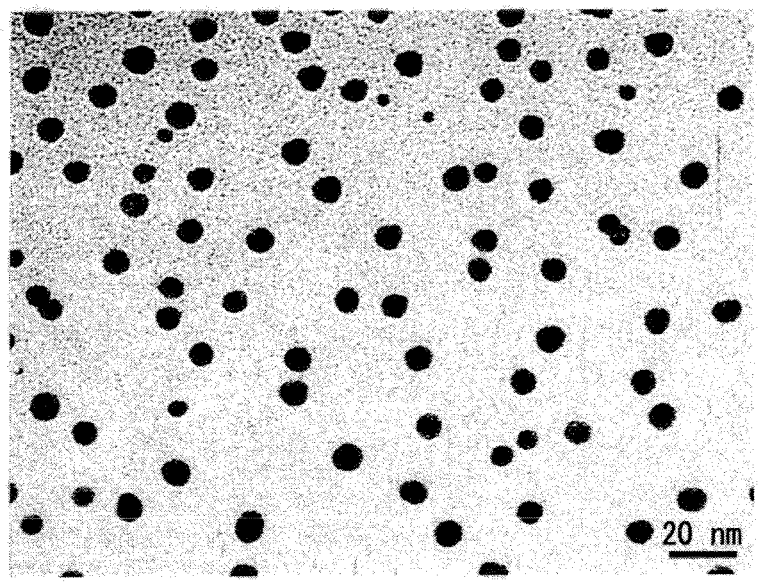
[FIG. 5] a transmission electron micrograph of gold nanoparticles prepared in the Example

FIG. 5 is a transmission electron micrograph of the gold nanoparticles deposited on a carbon support film obtained with a process of approximately two minutes. According to analysis by this kind of electron micrograph, with the method of the present invention, the number of gold nanoparticles deposited per one square micrometer/minute was approximately 2990 nanoparticles, which shows a generation efficiency approximately 14 times better than the technology in Patent Document 4.

Moreover, the gold nanoparticles obtained with the method of the present invention are particles that exhibit superior mono-dispersibility.

Figure 6:
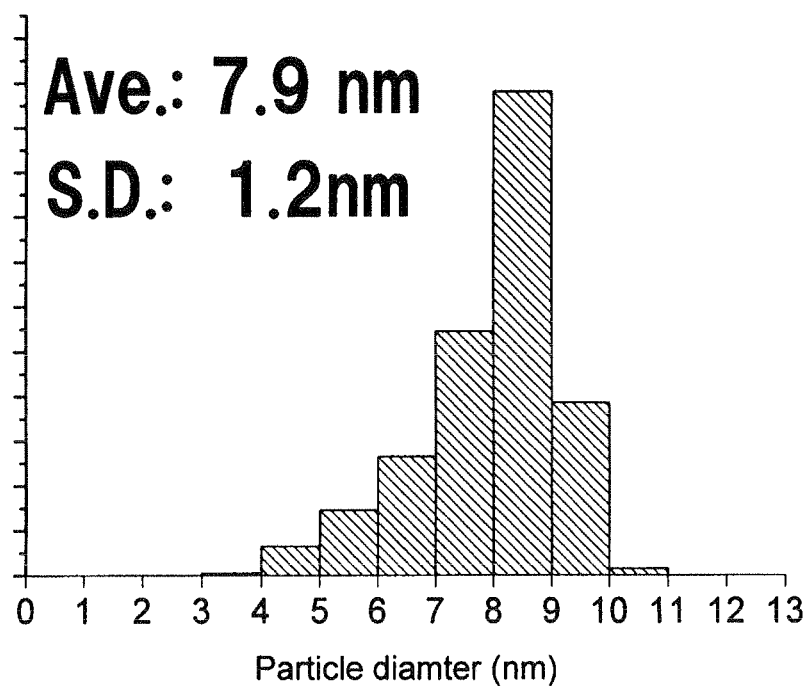
[FIG. 6] a grain size histogram of gold nanoparticles prepared in the Example.

FIG. 6 is a grain size histogram of the particles captured by the carbon film placed 5 mm downstream from the capillary tube outlet in the foregoing Example. The average grain size of the nanoparticles was 7.9 nm, the standard deviation was 1.2 nm, and this shows that high-level mono-dispersible nanoparticles can be collected with the present invention.

Similar results have been confirmed under conditions where the pulse-modulated frequency was 10 to 100 Hz.

INDUSTRIAL APPLICABILITY

The method of the present invention is able to prepare and deposit, at a high efficiency, nanoparticles of noble metals represented by gold, and of a low melting point material such as tin, magnesium, and indium.

For example, the present invention is effective in preparing a gold nanoparticles-dispersed substrate for fixing functionalized molecules in which the ends thereof are thiolated in bio research and the like.

Moreover, as an example of industrial application, the present invention may be used for the purpose of improving bondability upon bonding materials.

This international application relates to and claims priority from Japanese Patent Application No. 2008-053193, filed on Mar. 4, 2008, the entire disclosure of which is incorporated herein by reference. In addition, the entire disclosure of prior art documents and patents cited in this Application is incorporated herein by reference.

The invention claimed is:

1. A method of preparing nanoparticles of an inorganic material in which a wire made of the inorganic material is inserted into a plasma-generating capillary tube or a plasma-generating nozzle and atmospheric-pressure high frequency plasma having of frequency of several hundred MHz is generated in the capillary tube or nozzle, wherein the plasma is generated by applying a voltage at a frequency of several hundred MHz possessing a waveform which exhibits its maximum value when it rises and then immediately falls, and which is pulse-modulated so that the duty ratio thereof is 10% or less.

2. The method of preparing inorganic nanoparticles according to claim 1, wherein the duty ratio is 5% or less.

3. The method according to claim 1, wherein the inorganic material is a metal.

4. The method according to claim 1, wherein the inorganic material is selected from the group consisting of magnesium, tin, and indium.

5. The method according to claim 1, wherein the inorganic material is selected from the group consisting of gold and platinum.

6. The method according to claim 1, wherein the frequency is 450 MHz.

7. A method of preparing inorganic nanoparticles, comprising the steps of: inserting a wire made of inorganic material into a plasma-generating capillary tube or a plasma-generating nozzle; and generating an atmospheric-pressure plasma having of frequency of several hundred MHz in the capillary tube or nozzle by applying a voltage at a frequency of several hundred MHz possessing a waveform which exhibits its maximum value when it rises and then immediately falls and which is pulse-modulated so that a duty ratio thereof is 10% or less; wherein the generation of plasma is maintained by causing the waveform of the voltage which was pulse-modulated to be a waveform in which a rectangular waveform of a constant height is additionally added thereto.

8. The method according to claim 7, wherein the duty ratio is 5% or less.

* * * * *